US012073754B2

(12) United States Patent
Dekel et al.

(10) Patent No.: US 12,073,754 B2

(45) Date of Patent: Aug. 27, 2024

(54) SPECTRAL SENSING-BASED ADAPTIVE CONTROL OF DISPLAY COLOR

(71) Applicant: Microsoft Technology Licensing, LLC, Redmond, WA (US)

(72) Inventors: Shoham Dekel, Tel Aviv (IL); Daniel Spivak, Ness Ziona (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/659,471

(22) Filed: Apr. 15, 2022

(65) Prior Publication Data

US 2023/0335031 A1 Oct. 19, 2023

(51) Int. Cl.

*G09G 5/02* (2006.01)
*G09G 3/00* (2006.01)
*G09G 3/20* (2006.01)

(52) U.S. Cl.

CPC .......... *G09G 3/2003* (2013.01); *G09G 3/035* (2020.08); *G09G 2320/0666* (2013.01); *G09G 2320/0686* (2013.01); *G09G 2320/0693* (2013.01); *G09G 2360/145* (2013.01)

(58) Field of Classification Search

CPC ................ G09G 3/2003; G09G 3/035; G09G 2320/0666; G09G 2320/0686; G09G 2320/0693; G09G 2360/145

See application file for complete search history.

(56) References Cited

U.S. PATENT DOCUMENTS

| | | | | |
|---|---|---|---|---|
| 5,459,678 | A * | 10/1995 | Feasey | H04N 17/02 358/416 |
| 10,345,151 | B1 | 7/2019 | Sarkar et al. | |
| 10,497,297 | B2 | 12/2019 | Chen et al. | |
| 10,747,263 | B2 * | 8/2020 | Aurongzeb | H01L 27/3211 |
| 10,911,748 | B1 * | 2/2021 | Molholm | H04N 17/04 |

(Continued)

FOREIGN PATENT DOCUMENTS

CN 111796783 A 10/2020

OTHER PUBLICATIONS

"Adjust the Screen Brightness and Color on iPhone", Retrieved from: https://web.archive.org/web/20211229234523/https://support.apple.com/en-in/guide/iphone/welcome/ios, Dec. 29, 2021, 3 Pages.

(Continued)

*Primary Examiner* — Antonio Xavier

(74) *Attorney, Agent, or Firm* — Alleman Hall & Tuttle LLP

(57) ABSTRACT

A method of adaptively controlling display color of a display of a computing device is disclosed. Spectral sensing data is received via a spectrometer positioned on a first side of the computing device. Light sensing data is received via a light sensor on a second side of the computing device that opposes the first side. A spectral light source profile is selected from a plurality of different spectral light source profiles based at least on the spectral sensing data. Each of the plurality of different spectral light source profiles have different color calibration values. Display color of the display is adaptively controlled based at least on the light sensing data and the color calibration values of the selected spectral light source profile.

20 Claims, 6 Drawing Sheets

(56) References Cited

U.S. PATENT DOCUMENTS

| | | | | |
|---|---|---|---|---|
| 2006/0289760 | A1* | 12/2006 | Bathiche | G02B 27/1053 348/E9.026 |
| 2007/0146356 | A1* | 6/2007 | Ladouceur | G09G 3/36 345/207 |
| 2008/0303918 | A1 | 12/2008 | Keithley | |
| 2012/0154477 | A1* | 6/2012 | Yamazaki | B41J 2/2146 347/19 |
| 2016/0187199 | A1* | 6/2016 | Brunk | G01J 3/0208 348/89 |
| 2017/0294173 | A1 | 10/2017 | Sun et al. | |
| 2018/0247588 | A1* | 8/2018 | Lee | G09G 3/3225 |
| 2020/0099905 | A1* | 3/2020 | Post | G09G 3/2003 |
| 2020/0211440 | A1 | 7/2020 | Lee et al. | |
| 2020/0349375 | A1* | 11/2020 | Quigley | G06V 10/764 |
| 2021/0097943 | A1* | 4/2021 | Wyatt | H01L 33/504 |
| 2021/0256931 | A1* | 8/2021 | Davis | G02B 27/126 |
| 2022/0132052 | A1* | 4/2022 | Mojaver | A61B 5/021 |

OTHER PUBLICATIONS

Kim, et al., "Color-Shift Compensation for Foldable OLED Display", Retrieved from: https://www.tdcommons.org/cgi/viewcontent.cgi?article=4467&context=dpubs_series, Jul. 2020, 12 Pages.

"International Search Report and Written Opinion Issued in PCT Application No. PCT/US23/011815", Mailed Date: Apr. 24, 2023, 12 Pages.

* cited by examiner

SPECTRAL SENSING-BASED ADAPTIVE CONTROL OF DISPLAY COLOR

BACKGROUND

Mobile computing devices are widely used both indoors and outdoors under different ambient lighting conditions. Different ambient lighting conditions affect perceived color image quality of a display of a mobile computing device. In particular, different ambient lighting conditions affect a human's perception of physical tristimulus values that define a white point of the display as well as a brightness and correlated color temperature (CCT) of the display. For example, a display having a fixed white point that is calibrated for bright ambient lighting conditions may be perceived as having lower display color accuracy or color image quality (e.g., an off-white white point) under lower ambient lighting conditions.

SUMMARY

A method of adaptively controlling display color of a display of a computing device is disclosed. Spectral sensing data is received via a spectrometer positioned on a first side of the computing device. Light sensing data is received via a light sensor on a second side of the computing device that opposes the first side. A spectral light source profile is selected from a plurality of different spectral light source profiles based at least on the spectral sensing data. Each of the plurality of different spectral light source profiles have different color calibration values. Display color of the display is adaptively controlled based at least on the light sensing data and the color calibration values of the selected spectral light source profile.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Figure 1:
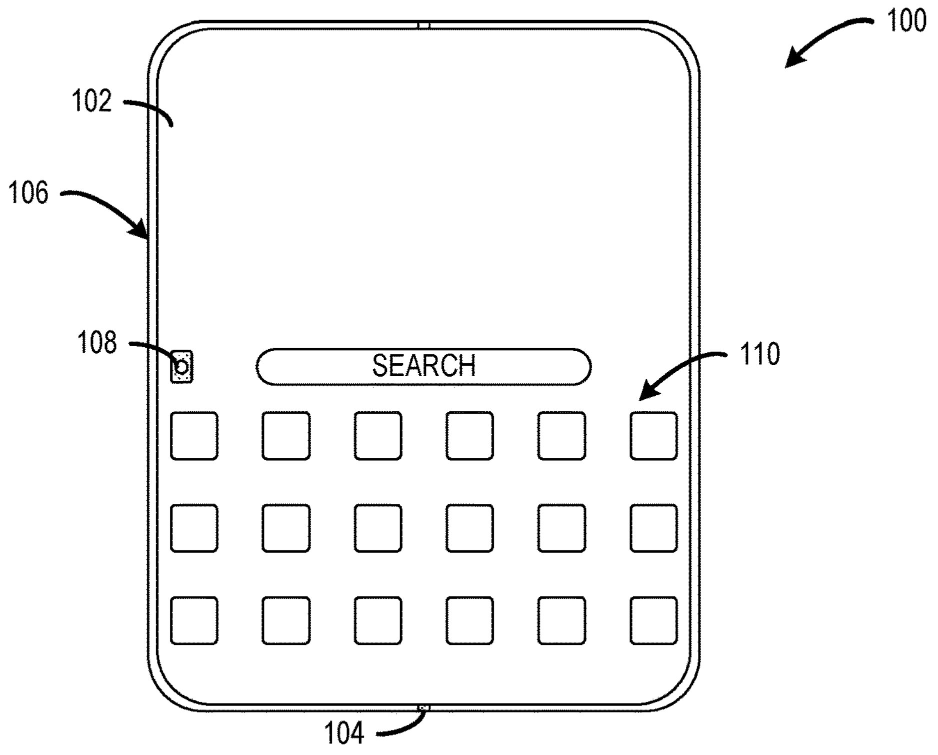
FIG. 1 shows a front display side of an example smartphone.

The present description is directed to an approach for adaptively controlling display color of a display of a computing device using light sensing data of a light sensor of the computing device in conjunction with spectral sensing data of a spectrometer of the computing device. The light sensor is configured to measure ambient lighting conditions. The spectrometer is also configured to measure ambient lighting conditions but with a higher degree of color granularity than the light sensor. In particular, the approach uses the spectral sensing data to select a spectral light source profile corresponding to a particular light source from a plurality of different spectral light source profiles corresponding to different spectral light sources (e.g., florescent light, day light, incandescent light). Each of the spectral light source profiles include color calibration values that are used to adaptively control display color of the display to have desired color characteristics when the display is illuminated by light in the corresponding environment. Further, display color of the display may be adaptively controlled by switching between different spectral light source profiles to apply different color calibration values to maintain accurate display color of the display as ambient lighting conditions vary. For example, brightness and color values of the display may be adjusted using different color calibration values of different light source profiles to maintain accurate white point and correlated color temperature (CCT) of the display under varying ambient lighting conditions.

Such adaptive control of display color may be more accurate than other approaches that solely rely on light sensing data of a light sensor that is not as granular/accurate as spectral sensing data. Further, this approach leverages the presence of the front side spectrometer that is used for image enhancement of a front side camera to also be used for adaptive control of display color of the display. Moreover, using the spectral sensing data of the spectrometer in conjunction with the light sensing data of the light sensor may be less costly and less resource intensive than other approaches that employ multiple spectrometers on the front side and the display side of the computing device.

Furthermore, in some implementations, such an approach may selectively use spectral sensing data from a spectrometer for adaptive control of display color based at least on a confidence level of the spectral sensing data. The confidence level assesses a degree to which the spectral sensing data accurately characterizes the ambient lighting conditions that actually influence display color of the display of the computing device. In scenarios where the confidence level of the spectral sensing data is less than a threshold confidence level, a default profile is used to adaptively control display color of the display instead of using the spectral sensing data. Such an approach reduces display color control error that would otherwise be higher in scenarios where the spectral sensing data has reduced accuracy. In other words, using the confidence level for adaptive control of display color provides the technical benefit of tailoring content to a user device capability by improving display color accuracy through selective use of the spectral sensing data under conditions when the spectral sensing data is assessed to be more accurate and using a default profile under conditions when the spectral sensing data is assessed to be less accurate.

Figure 2:
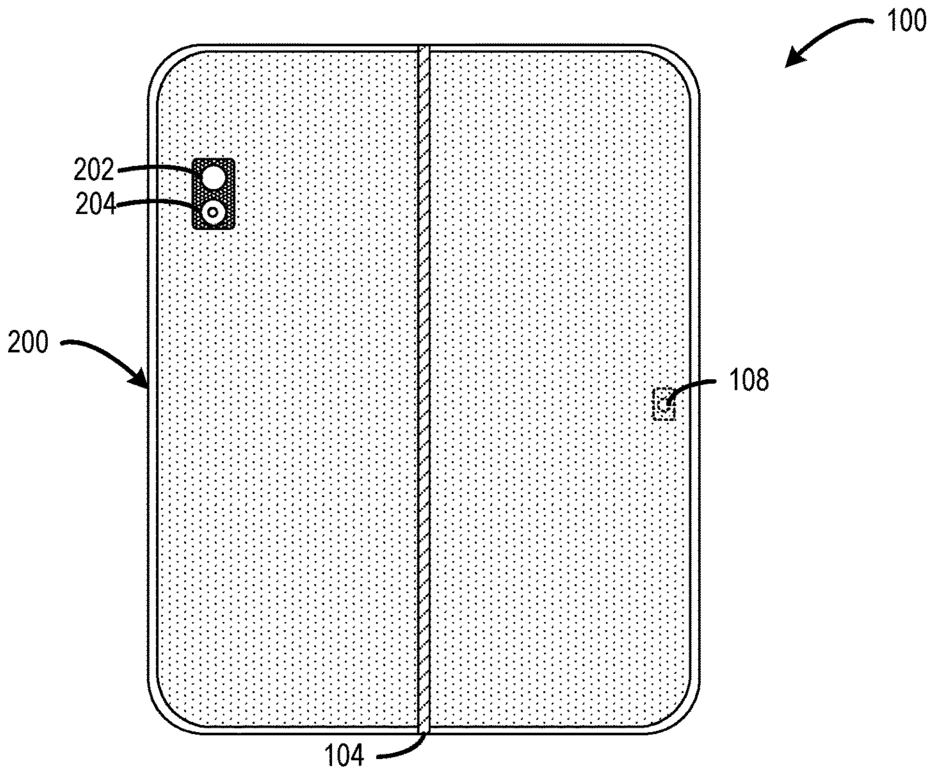
FIG. 2 shows a back camera side of the example smartphone of FIG. 1.
Figure 3:
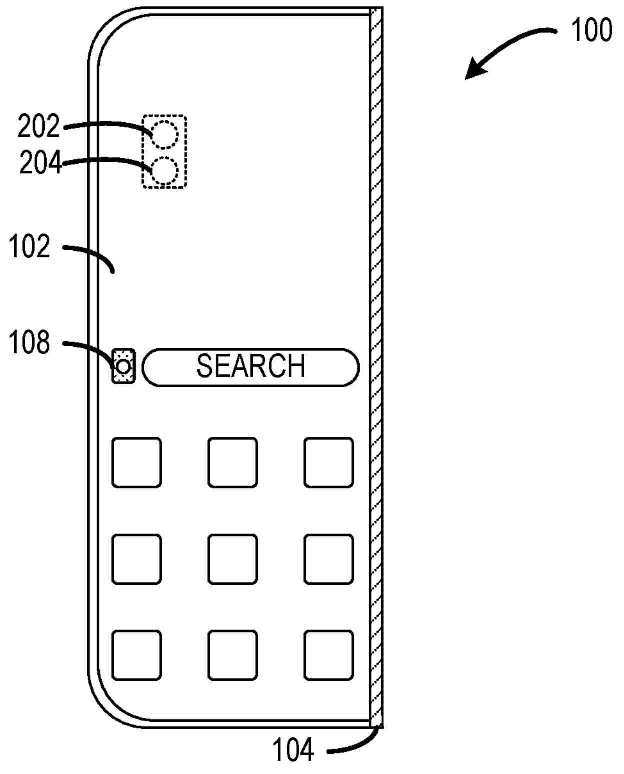
FIGS. 3-4 show the example smartphone of FIG. 1 in a folded posture.
Figure 4:
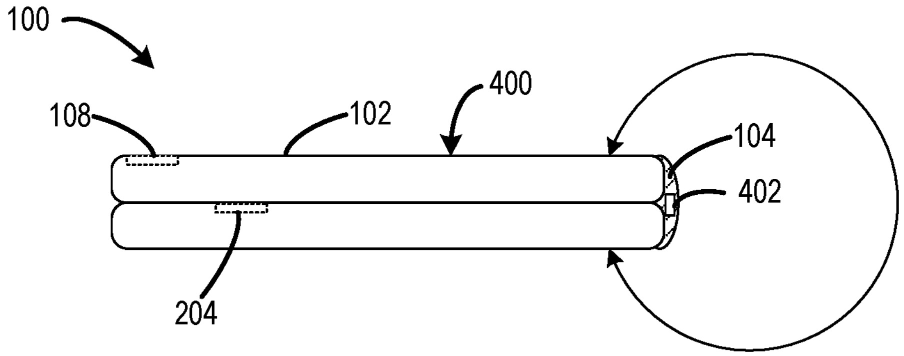

FIGS. 1-4 show an example mobile computing device in the form of a smartphone 100 that is configured to adaptively control display color of a display 102 according to the approach described herein. The smartphone 100 is configured to fold about a hinge 104 between an unfolded posture and different folded postures. FIGS. 1 and 2 show the smartphone 100 in an unfolded posture. FIGS. 3 and 4 show the smartphone 100 in an example folded posture.

FIG. 1 shows a display side 106 of the smartphone 100 including the display 102. The display 102 is a full-screen, touch-sensitive display. In the illustrated example, the display 102 visually presents a plurality of icons 110 corresponding to different application programs that are executable by the smartphone 100. A user may provide touch input to the display 102 to select an icon of the plurality of icons 110 to execute an application program corresponding to the selected icon. The display 102 may be implemented using any suitable display technology (e.g., foldable OLED).

The display side 106 of the smartphone 100 includes a light sensor 108 configured to output light sensing data indicating lighting conditions of the environment in front of the display side 106 of the smartphone 100. The light sensing data may be used to adaptively control display color of the display 102. The light sensor 108 may be positioned at any suitable position on the display side 106 of the smartphone 100. In the illustrated example, the light sensor 108 is located behind the display 102. For example, the display 102 may be at least partially transparent or have a transparent region through which the light sensor 108 measures light. In other examples, the light sensor 108 may be positioned in a bezel of the display 102.

FIG. 2 shows an outward-facing camera side 200 of the smartphone 100 that opposes the display side 106. The camera side 200 includes a camera 202 and a spectrometer 204. The camera 202 is configured to image a scene in front of the camera side 200 of the smartphone 100. The camera 202 may take any suitable form. In some examples, the camera 202 is a visible-light camera. In some examples, the smartphone 100 may include alternative or additional cameras including cameras having different focal lengths, thermal cameras, infrared cameras and/or depth cameras.

The spectrometer 204 is configured to output spectral sensing data indicating values corresponding to individual narrow wavelength spectrum bands in the electromagnetic spectrum. The spectral sensing data of the spectrometer 204 may be used to enhance image data captured by the camera 202. In some examples, the smartphone 100 may be configured to output spectral images or hyperspectral images based at least on processing image data of the camera 202 and spectral sensing data of the spectrometer 204. In some examples, the smartphone 100 may be configured to perform other image enhancement processing based at least on the spectral sensing data of the spectrometer 204. Additionally, the spectral sensing data of the spectrometer 204 is used in conjunction with the light sensing data of the light sensor 108 to adaptively control display color of the display 102 as discussed in further detail below. The herein described approach leverages the presence of the front side spectrometer for image enhancement of the camera by also using the spectral sensing data output by the spectrometer for adaptive control of display color. In this manner, the spectrometer beneficially plays a dual role to improve operation of the smartphone.

Note that in the illustrated example the camera 202 and the spectrometer 204 are not only on opposing sides of the smartphone 100 relative to the light sensor 108, but also the camera 202 and the spectrometer 204 are positioned on an opposing end relative to the position of the light sensor 108. The light sensor 108, the camera 202, and the spectrometer 204 may be positioned at any suitable positions on respective sides of the smartphone 100.

As shown in FIG. 4, the hinge 104 is configured to rotate approximately 360 degrees to vary a degree to which the smartphone is folded. The hinge 104 may be rotated to any suitable angle. The hinge 104 may be rotated to different angles to allow the smartphone 100 to provide different functionality. As shown in FIGS. 1 and 2, the smartphone 100 is placed in the unfolded posture where the hinge 104 is at a 180-degree rotation angle. In the unfolded posture, the viewable size of the display 102 is increased relative to when the smartphone 100 is in the 360-degree folded posture as shown in FIGS. 3 and 4. In this folded posture, the smartphone 100 is folded with the hinge at a 360-degree rotation angle. The smartphone 100 may be placed in the 360-degree folded posture to allow a portion of the display 102 to remain exposed for viewing while reducing an overall size of the smartphone 100 relative to when the smartphone 100 is placed in the unfolded posture. In the 360-degree folded posture, the smartphone 100 may be easier to hold one-handed relative to the unfolded posture.

The smartphone 100 may be placed in a zero-degree folded posture where the hinge 104 is at a zero-degree rotation angle and the display 102 is folded in on itself. In the zero-degree folded posture, the display 102 is not exposed and is protected from incidental contact.

The smartphone 100 may be placed in various intermediate folded postures. In one example, when the hinge is rotated at a rotation angle between 90-180 degrees, the smartphone 100 may be configured to mimic a laptop design in which a virtual keyboard is displayed on one side of the display 102 and a graphical user interface is displayed on the other side of the display 102. In another example, when the hinge is rotated between 200-300 degrees, the smartphone 100 may be configured to display content while free standing like an A-frame or a sandwich board.

The smartphone 100 is provided as a non-limiting example of a mobile computing device that is configured to adaptively control display color of a display according to the approach described herein. In other implementations, other types of computing devices may be configured to perform the approach described herein. In some implementations, a smartphone that is not foldable may be configured to perform the approach described herein, for example. In some implementations, display color of a display of a fixed computing device may be adaptively controlled according to the approach described herein.

Figure 5:
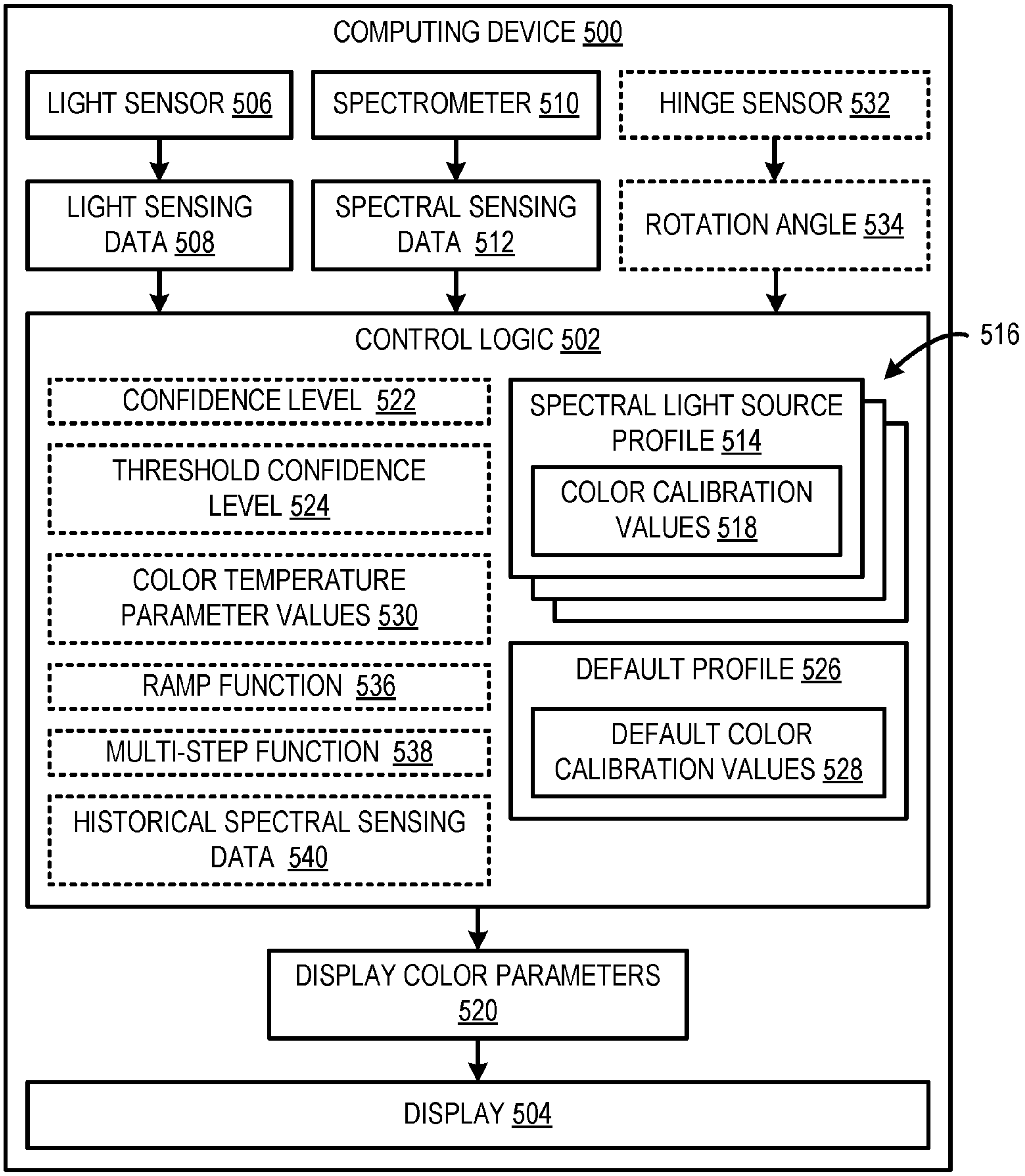
FIG. 5 shows a system block diagram of an example computing device.

FIG. 5 shows a system block diagram of an example computing device 500. For example, the computing device 500 may correspond to the smartphone 100 shown in FIGS. 1-4 or another type of mobile computing device. In other examples, the computing device 500 may correspond to another type of fixed computing device. The computing device 500 includes control logic 502 configured to adaptively control display color of a display 504. The control logic 502 may be implemented using any suitable configuration of hardware/software/firmware components.

The computing device 500 includes a light sensor 506 configured to output light sensing data 508. In some examples, the light sensing data 508 may include RGB color values. In some examples, the light sensing data 510 may include a brightness value. In some examples, the light sensing data 510 may include an infrared or near-infrared value. In some examples, the light sensing data 510 may include a combination of any of the above parameter values and/or other suitable light sensing parameter values.

The computing device 500 includes a spectrometer 510 configured to output spectral sensing data 512 including values corresponding to individual narrow wavelength spectrum bands in the electromagnetic spectrum. The spectrometer 510 may be configured to sample values from any suitable number of different narrow wavelength spectrum bands across the electromagnetic spectrum. In some examples, the spectrometer 510 may be configured to sample values on the order of tens to hundreds of different wavelength spectrum bands. Further, the spectrometer 510 may be configured to sample wavelength spectrum bands having any suitable width and/or wavelength range. In general, the spectral sensing data 512 of the spectrometer 510 provides a higher degree of color/spectrum granularity than the light sensing data 508 output by the light sensor 506. In other words, the spectrometer 510 has a higher spectral resolution than the light sensor 506.

The control logic 502 is configured to adaptively control display color of the display 504 based at least on the light sensing data 508 and the spectral sensing data 512. In particular, the spectral sensing data 512 is used to select a spectral light source profile 514 from a plurality of different spectral light source profiles 516 corresponding to different spectral light sources (e.g., florescent light, day light, incandescent light). Each of the plurality of different spectral light source profiles 516 includes different color calibration values 518 that are tuned to compensate for different spectral values/components of the type of ambient light in which the computing device 500 is operating. The control logic 502 is configured to apply the color calibration values 518 of the selected spectral light source profile 514 to display color parameters 520 of the display 504 to adaptively control the display color. In one example, the display color parameters 520 include brightness and color values of the display 504 that may be adjusted based at least on the color calibration values 518 of a selected spectral light source profile associated with a light source to maintain accurate white point and CCT of the display 504.

The control logic 502 may be configured to adaptively switch between different spectral light source profiles to maintain accurate display color control as ambient lighting conditions vary. Such adaptive control of display color may be more accurate than other approaches that solely rely on light sensing data of a light sensor since the light sensor has reduced accuracy relative to the spectrometer to determine ambient lighting conditions under which the computing device operates. Further, this approach leverages the presence of the front side spectrometer that is used for image enhancement of the camera to also be used for adaptive control of display color of the display. Moreover, using the spectral sensing data of the spectrometer in conjunction with the light sensing data of the light sensor may be less costly and less resource intensive than other approaches that employ multiple spectrometers on the front side and the display side of the computing device.

In some implementations, the control logic 502 may selectively use the spectral sensing data 512 of the spectrometer 204 for adaptive control of display color of the display 504 based at least on a confidence level 522 of the spectral sensing data 512. The confidence level 522 assesses a degree to which the spectral sensing data 512 accurately characterizes the ambient lighting conditions that actually influence display color of the display 504. In scenarios where the confidence level 522 of the spectral sensing data is greater than a threshold confidence level 524, the control logic 502 uses the spectral sensing data 512 to select the spectral light source profile 514. In scenarios where the confidence level 522 of the spectral sensing data 512 is less than the threshold confidence level 524, the control logic 502 instead selects a default profile 526 to adaptively control display color of the display 504. The default profile includes default color calibration values 528 that are selected to provide desirable display color in unknown ambient lighting conditions. The default color calibration values 528 are tuned to minimize error between the different spectral light sources. Such an approach provides the technical benefit of reducing a display color control error that would otherwise be higher when using the spectral sensing data that has reduced accuracy.

The control logic 502 may be configured to determine the confidence level of the spectral sensing data in any suitable manner. In some implementations, the control logic 502 is configured to determine the confidence level of the spectral sensing data 512 of the spectrometer 510 based at least on analysis of the spectral sensing data 512 in relation to the light sensing data 508 of the light sensor 506. In one example, a correlation between corresponding color temperature parameter values 530 determined from the spectral sensing data 512 and the light sensing data 508 is used to determine the confidence level of the spectral sensing data 512.

For example, a red channel parameter value of the light sensing data 508 obtained by the light sensor at time T1 may be compared to a wavelength spectrum band value of the spectral sensing data 512 corresponding to the red channel that was sampled by spectrometer 510 at time T1. In one example, the confidence level is determined in proportion to a difference between the compared color temperature parameter values 530. In one example, the confidence level 522 increases as the difference in color temperature parameter values 530 decreases. Such a comparison of color temperature parameter values 530 can forecast that both sensors are detecting light from the same light source or light from different spectral light sources having different color temperature characteristics (e.g., ambient light and florescent light may have a large red channel color difference). The comparison of color temperature parameter values 530 provides the technical benefit of allowing for an assessment of spectral sensing data accuracy to be made in a resource efficient manner using available sensor data.

In some implementations, the control logic 502 may be configured to determine the confidence level 522 based at least on a plurality of comparisons of color temperature parameter values 530 across a plurality of color channels and wavelength spectrum bands. The control logic 502 may be configured to determine the confidence level 522 based at least on a correlation between any suitable color temperature parameters or other parameters that defines a chromatic property of light including luminance level (lux), CCT, delta E, and/or matrices of values representing estimation of color in different wavelength spectrum bands.

In some implementations, the computing device 500 may be foldable around a hinge. For example, the computing device 500 may correspond to the smartphone 100 including the hinge 104. The computing device 500 may include a hinge angle sensor 532 configured to determine a rotation angle 534 of the hinge. In some implementations, the control logic 502 is configured to determine the confidence level 522 of the spectral sensing data 512 of the spectrometer 510 based at least on the rotation angle 534 of the hinge provided by the hinge angle sensor 532.

In one example, the control logic 502 is configured such that once the hinge is rotated past a designated rotation angle, the confidence level 522 falls below the threshold confidence level 524 because it is assumed that the spectrometer 510 is blocked by a folded portion of the computing device 500. In some implementations, the confidence level 522 may be weighted in proportion to the rotation angle 534 of the hinge. In one example, within a designated angular range between the spectrometer 510 being fully covered to fully uncovered, the confidence level 522 may increase in relation to the angular position of the hinge within this angular range as it moves toward the point of being fully uncovered. In other words, as the spectrometer 510 captures more and more actual ambient light in the surrounding environment, the confidence level 522 of the spectral sensing data 512 increases. The control logic 502 may be configured to weight the confidence level 522 in any suitable manner to assess the accuracy of the spectral sensing data 512. Tracking the rotation angle of the hinge provides the technical benefit of allowing for an assessment of spectral sensing data accuracy to be made in a resource efficient manner using available sensor data.

In some implementations, the control logic 502 may be configured to determine the confidence level 522 based at least on multiple factors. For example, the control logic 502 may be configured to determine the confidence level 522 based at least on a correlation between corresponding color temperature parameter values of the light sensing data 508 and the spectral sensing data 512 as well as the rotation angle 534 of the hinge.

The control logic 502 may be configured to determine that the confidence level 522 of the spectral sensing data 512 is less than the threshold confidence level 524 due to various operating conditions. In some scenarios, the spectrometer 510 may be at least partially covered up or blocked. In such scenarios, it is likely that the spectral sensing data does not accurately characterize the ambient lighting conditions that influence the display 102. Returning to the example of the smartphone 100 shown in FIGS. 1-4, in one scenario, the smartphone 100 may be placed with the camera side 200 face down on a surface, such that the spectrometer 204 is blocked by the surface. In another scenario, the smartphone 100 may be placed in the folded posture as shown in FIGS. 3 and 4. In particular, the spectrometer 204 is covered by a folded portion 400 of the smartphone 100. Further, the light sensor 108 is still exposed to the environment, so the light sensing data can still be used for adaptive control of the display 102 when the smartphone 100 is in this folded posture.

The control logic 502 is configured to determine the confidence level of the spectral sensing data 512 continuously/repeatedly over time and switch between the different spectral light source profiles 516 and the default profile 526 to adaptively control display color of the display 504 as ambient light conditions change.

In some implementations, the control logic 502 may be configured to transition between using different color calibration values of different profiles via different functions to dynamically control display color of the display 504. In some examples, the control logic 502 may transition from color calibration values of one profile to calibration values of a different profile via a ramp function 536. The ramp function 536 provides a linear change of display color between the different calibration values over a designated duration. In some examples, the control logic 502 may transition from color calibration values of one profile to calibration values of another profile via an intermediate multi-step function 538. The multi-step function 538 may provide a series of small steps of intermediate color values in between the different calibration values over a designated duration. The control logic 502 may employ these or any other suitable transition functions (e.g., nonlinear) to smooth a change in color of the display 504 so as not to be perceived as being an abrupt change in color (e.g., a flash or flicker) when transitioning between profiles. Note that such transition functions may be employed for transitions between different light source profiles 516 and/or transitions to/from the default profile 526. Such linear/intermediate-step changes in display color provide the specific technical benefit of improving display performance by smoothing a change in the displayed color resulting from changes between calibration values of different profiles.

In some implementations, the control logic 502 may be configured to use historical spectral sensing data 540 in scenarios where the confidence level 522 of the spectral sensing data 512 drops below the threshold confidence level 524. In one example, the historical spectral sensing data 540 includes spectral sensing data that most recently had a confidence level greater than the threshold confidence level 524 prior to the confidence level of the spectral sensing data becoming less than the threshold confidence level 524. The control logic 502 may be configured to select a spectral light source profile based at least on the historical spectral sensing data 540 and adaptively control the display 504 based on the light sensing data 508 and color calibration values of the selected spectral light source profile. It is assumed that the historical spectral sensing data 540 provides an indication of the ambient lighting conditions for at least some time duration after the drop in confidence level since the ambient lighting conditions are not likely to have changed even though the state of the spectrometer 510 has changed (e.g., the spectrometer has become blocked).

In some examples, the control logic 502 may be configured to use the historical spectral sensing data 540 to adaptively control display color of the display 504 for up to a designated duration after the confidence level drops below the threshold confidence level 524. For example, the control logic 502 may be configured to use the historical spectral sensing data 540 for up to 30 seconds, 1 minute, 5 minutes, or another suitable duration after the confidence level drops below the threshold confidence level. Further, the control logic 502 may be configured to switch to the default profile 526 after the designated duration has elapsed if the confidence level 522 of the spectral sensing data 512 has not yet increased above the threshold confidence level 524. The control logic 502 may be configured to adaptively control display color of the display 502 based at least on the historical spectral sensing data 540 in any suitable manner.

In some examples, the control logic 502 may be configured to use the historical spectral sensing data 540 to adaptively control display color of the display 504 while the confidence level of 522 of the spectral sensing data 512 is less than the threshold confidence level 524 provided that the light sensing data 508 does not change by a threshold deviation. For example, such a threshold deviation may indicate a significant change in ambient lighting conditions. The control logic 502 may be configured to switch to the default profile 526 based at least on the light sensing data 508 changing by the threshold deviation. In this scenario, the historical spectral sensing data 540 no longer accurately compensates for the current ambient lighting conditions since the ambient light conditions have changed by the threshold deviation in the light sensing data 508. Using the historical spectral sensing data for adaptive control of display color provides the technical benefit of tailoring content to a user device capability by improving display color accuracy relative to a different control approach that uses spectral sensing data output from the spectrometer when the spectrometer becomes blocked or otherwise has reduced accuracy.

Figure 6:
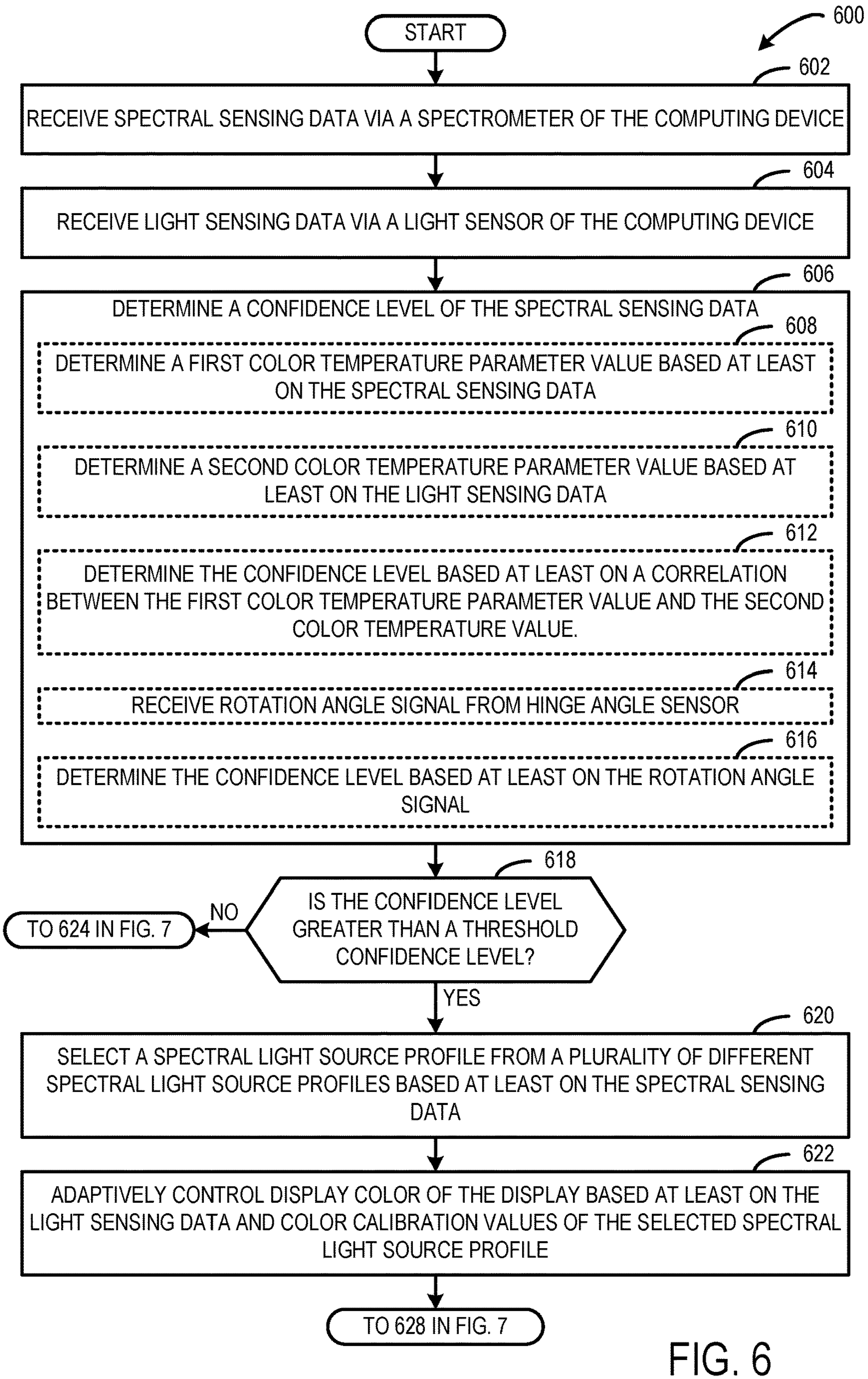
FIGS. 6 and 7 show an example method of adaptively controlling display color of a display of a computing device.
Figure 7:
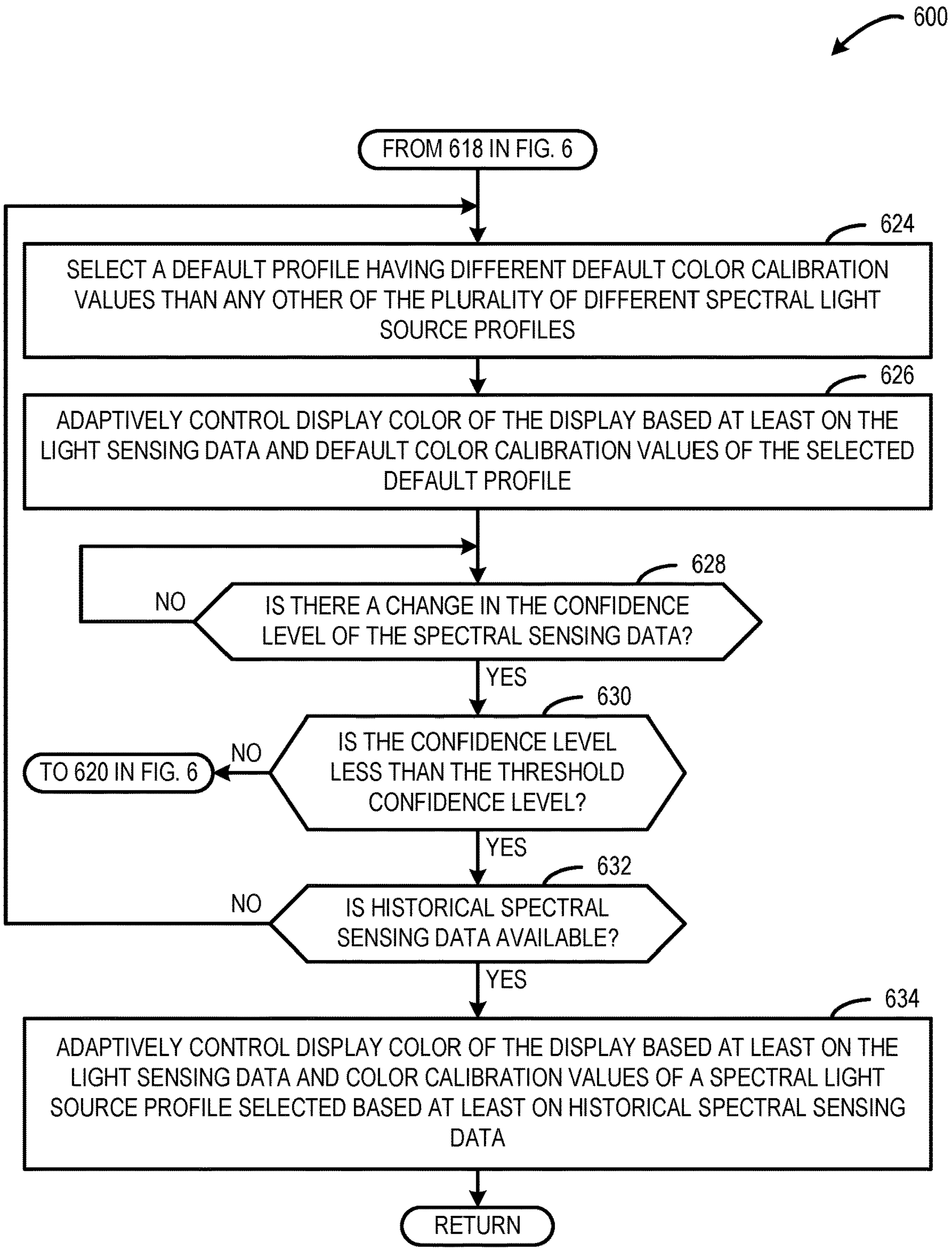

FIGS. 6 and 7 show an example method 600 of adaptively controlling display color of a display of a computing device. For example, the method 600 may be performed by the smartphone 100 shown in FIGS. 1-4, the computing device 500 shown in FIG. 5, the computing system 800 shown in FIG. 8, any other suitable mobile computing device, or any other suitable fixed computing device.

In FIG. 6, at 602, the method 600 includes receiving spectral sensing data via a spectrometer of the computing device. In some examples, the spectrometer may be positioned on a first side of the computing device. Referring to the example shown in FIG. 1, the spectrometer 204 is positioned on a camera side 200 of the smartphone 100. At 604, the method 600 includes receiving light sensing data via a light sensor. In some examples, the light sensor may be positioned on a second side of the computing device that opposes the first side. In the example shown in FIG. 1, the light sensor 108 is positioned on a display side 106 that opposes the camera side 200 of the smartphone 100. At 606, the method 600 includes determining a confidence level of the spectra sensing data.

In some implementations, the confidence level may be determined based at least on analysis of color temperature parameters corresponding to the spectral sensing data and the light sensing data. At 608, the method 600 may include determining a first color temperature parameter value based at least on the spectral sensing data. At 610, the method 600 may include determining a second color temperature parameter value based at least on the light sensing data. At 612, the method 600 may include determining the confidence level based at least on a correlation between the first color temperature parameter value and the second color temperature value. In one example, a red color channel value of the light sensing data may be compared with a value of a wavelength spectral band of the spectral sensing data that corresponds to red color channel, and the two values may be determined to be correlated based on a difference between the two values being less than a threshold difference. The two values may be determined to be correlated in any suitable manner. Further, any suitable parameters derived from the spectral sensing data and the light sensing data may be compared to determine the confidence level of the spectral sensing data.

In some implementations where the computing device is foldable about a hinge, the confidence level may be determined based at least on a rotation angle of the hinge. At 614, the method 600 may include receiving a rotation angle signal from a hinge angle sensor. The rotation angle signal indicates a rotation angle of the hinge of the computing device. At 616, the method 600 may include determining the confidence level based at least on the rotation angle signal. In scenarios where the computing device is in a folded posture where a folded portion of the device blocks the spectrometer, the confidence level may be determined to be below a threshold confidence level. On the other hand, in scenarios where the computing device is in an unfolded posture where the spectrometer is not blocked, the confidence level may be determined to be greater than the threshold confidence level.

At 618, the method 600 includes determining if the confidence level of the spectral sensing data is greater than the threshold confidence level. If the confidence level of the spectral sensing data is greater than the threshold confidence level, then the method moves to 620. Otherwise, the method 600 moves to 624 in FIG. 7.

At 620, the method 600 includes selecting a spectral light source profile from a plurality of different spectral light source profiles based at least on the spectral sensing data. Each of the plurality of different spectral light source profiles have different color calibration values that are tuned to compensate for light emitted by the spectral light source corresponding to the selected profile.

At 622, the method 600 includes adaptively controlling display color of the display based at least on the light sensing data and the color calibration values of the selected spectral light source profile and then moving to 628 in FIG. 7. In one example, adaptively controlling display color of the display includes adjusting at least one of color values and brightness values of pixels of the display based at least on the color calibration values of the selected spectral light source profile.

Turning to FIG. 7, at 624, the method 600 includes based at least on the confidence level of the spectral sensing data being less than the threshold confidence level, selecting a default profile having default color calibration values that differ from the color calibration values of any other of the plurality of different spectral light source profiles. The default color calibration values may be tuned to produce desirable display color results in unknown ambient lighting conditions. At 626, the method 600 includes adaptively controlling display color of the display based at least on the light sensing data and the default color calibration values of the selected default profile.

At 628, the method 600 includes determining if there is a change in the confidence level of the spectral sensing data. Such a change in confidence may monitored based at least on receiving updated spectral sensing data from the spectrometer. Such monitoring may be performed at any suitable frequency or sampling rate. If it is determined that there is a change in the confidence level, then the method 600 moves to 630. Otherwise, the method 600 returns to 628 and continues to monitor for changes in the confidence level.

At 630, the method 600 includes determining if the confidence level is less than the threshold confidence level. If the confidence level is less than the threshold confidence level, then the method 600 moves to 632. Otherwise, the method 600 moves to 620 in FIG. 6 and a spectral light source profile is selected based on the updated spectral sensing data.

At 632, the method 600 includes determining if there is historical spectral sensing data available. The historical spectral sensing data includes spectral sensing data having a confidence level greater than the threshold confidence level and that was received prior to determining that the confidence level of the spectral sensing data is less than the threshold confidence level. In other words, the historical spectral sensing data indicates the last time that the spectrometer provided spectra sensing data having a confidence greater than the confidence threshold.

At 634, the method 600 includes adaptively controlling display color of the display based at least on the light sensing data and color calibration values of a spectral light source profile selected based at least on historical spectral sensing data.

The method 600 provides the technical benefit of tailoring content to a user device capability by maintaining the accuracy of the display color across varying ambient lighting conditions. Further, the method 600 intelligently uses the spectral sensing data only under conditions when the spectral sensing data accurately characterizes the ambient light conditions that influence the computing device. The method 600 provides more accurate display color control relative to other approaches that rely solely on light sensing data of a light sensor. Further, in some examples, the method 600 leverages the presence of a spectrometer that is used for image enhancement of a front side camera to also be used for adaptive control of display color of the display.

In some implementations, the methods and processes described herein may be tied to a computing system of one or more computing devices. In particular, such methods and processes may be implemented as computer hardware, a computer-application program or service, an application-programming interface (API), a library, and/or other computer-program product.

Figure 8:
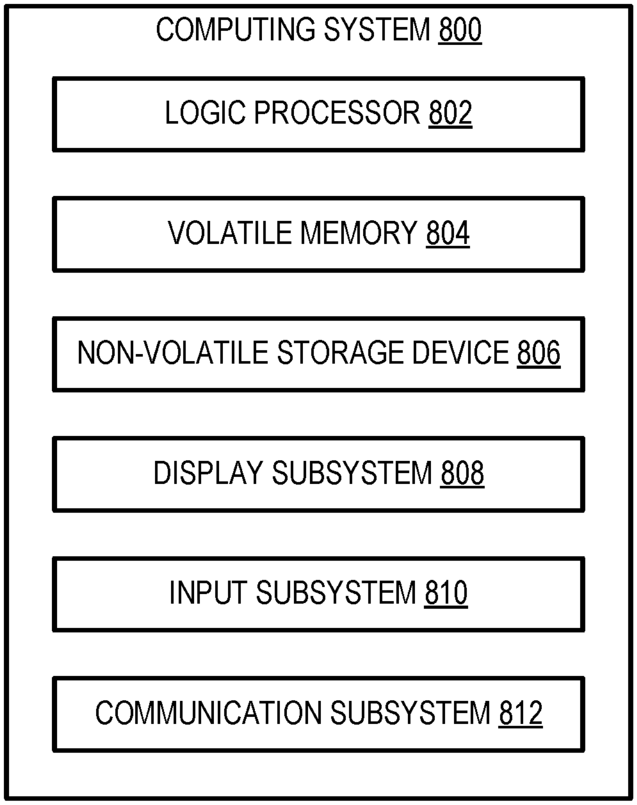
FIG. 8 shows an example computing system.

FIG. 8 schematically shows a non-limiting implementation of a computing system 800 that can enact one or more of the methods and processes described above. Computing system 800 is shown in simplified form. Computing system 800 may embody the smartphone 100 shown in FIGS. 1-4, the computing device 500 shown in FIG. 5 or any other computing device described herein. Computing system 800 may take the form of one or more foldable computing devices, tablet computers, home-entertainment computers, network computing devices, gaming devices, mobile computing devices, mobile communication devices (e.g., smartphone), and/or other computing devices, and wearable computing devices such as head-mounted, near-eye augmented/mixed/virtual reality devices.

Computing system 800 includes a logic processor 802, volatile memory 804, and a non-volatile storage device 806. Computing system 800 may optionally include a display subsystem 808, input subsystem 810, communication subsystem 812, and/or other components not shown in FIG. 8.

Logic processor 802 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor 802 may include one or more physical processors (hardware) configured to execute software instructions. Additionally or alternatively, the logic processor may include one or more hardware logic circuits or firmware devices configured to execute hardware-implemented logic or firmware instructions. Processors of the logic processor 802 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 806 includes one or more physical devices configured to hold instructions executable by the logic processors to implement the methods and processes described herein. When such methods and processes are implemented, the state of non-volatile storage device 806 may be transformed—e.g., to hold different data.

Non-volatile storage device 806 may include physical devices that are removable and/or built-in. Non-volatile storage device 806 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 806 may include nonvolatile, dynamic, static, read/write, read-only, sequential-access, location-addressable, file-addressable, and/or content-addressable devices. It will be appreciated that non-volatile storage device 806 is configured to hold instructions even when power is cut to the non-volatile storage device 806.

Volatile memory 804 may include physical devices that include random access memory. Volatile memory 804 is typically utilized by logic processor 802 to temporarily store information during processing of software instructions. It will be appreciated that volatile memory 804 typically does not continue to store instructions when power is cut to the volatile memory 804.

Aspects of logic processor 802, volatile memory 804, and non-volatile storage device 806 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 808 may be used to present a visual representation of data held by non-volatile storage device 806. The visual representation may take the form of a graphical user interface (GUI). As the herein described methods and processes change the data held by the non-volatile storage device, and thus transform the state of the non-volatile storage device, the state of display subsystem 808 may likewise be transformed to visually represent changes in the underlying data. Display subsystem 808 may include one or more display devices utilizing virtually any type of technology. Such display devices may be combined with logic processor 802, volatile memory 804, and/or non-volatile storage device 806 in a shared enclosure, or such display devices may be peripheral display devices.

When included, input subsystem 810 may comprise or interface with one or more user-input devices such as a keyboard, mouse, touch screen, microphone for speech and/or voice recognition, a camera (e.g., a webcam), or game controller.

When included, communication subsystem 812 may be configured to communicatively couple various computing devices described herein with each other, and with other devices. Communication subsystem 812 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some implementations, the communication subsystem may allow computing system 800 to send and/or receive messages to and/or from other devices via a network such as the Internet.

In an example, a method of adaptively controlling display color of a display of a computing device, the method comprises receiving spectral sensing data via a spectrometer positioned on a first side of the computing device, receiving light sensing data via a light sensor on a second side of the computing device that opposes the first side, selecting a spectral light source profile from a plurality of different spectral light source profiles based at least on the spectral sensing data, each of the plurality of different spectral light source profiles having different color calibration values, and adaptively controlling display color of the display based at least on the light sensing data and the color calibration values of the selected spectral light source profile. In this example and/or other examples, the method may further comprise determining a confidence level of the spectral sensing data, based at least on the confidence level of the spectral sensing data being greater than a threshold confidence level, selecting the spectral light source profile from the plurality of different spectral light source profiles based at least on the spectral sensing data, based at least on the confidence level of the spectral sensing data being less than the threshold confidence level, selecting a default profile having default color calibration values that differ from the color calibration values of any other of the plurality of different spectral light source profiles, and adaptively controlling display color of the display based at least on the light sensing data and the default color calibration values of the selected default profile. In this example and/or other examples, the method may further comprise determining a first color temperature parameter value based at least on the spectral sensing data, determining a second color temperature parameter value based at least on the light sensing data, and the confidence level of the spectral sensing data may be determined based at least on a correlation between the first color temperature parameter value and the second color temperature value. In this example and/or other examples, the computing device may be a mobile computing device that includes a hinge and a hinge angle sensor configured to determine a rotation angle of the hinge, the mobile computing device may be configured to fold about the hinge between an unfolded posture and a folded posture, the spectrometer may be at least partially covered by a folded portion of the mobile computing device when the mobile computing device assumes the folded posture, and the confidence level of the spectral sensing data may be determined based at least on the rotation angle of the hinge. In this example and/or other examples, the method may further comprise subsequent to adaptively controlling display color of the display based at least on the light sensing data and the color calibration values of the selected spectral light source profile, determining that the confidence level is less than the threshold confidence level based at least on a change in the spectral sensing data and/or the light sensing data, selecting the default profile based at least on the confidence level being less than the threshold confidence level, and adaptively controlling display color of the display based at least on the light sensing data and the default color calibration values of the selected default profile. In this example and/or other examples, adaptively controlling may include transitioning from the color calibration values of the selected spectral light source profile to the default color calibration values of the selected default profile via a ramp function. In this example and/or other examples, adaptively controlling may include transitioning from the color calibration values of the selected spectral light source profile to the default color calibration values of the selected default profile via an intermediate multi-step function. In this example and/or other examples, the method may further comprise based at least on the confidence level of the spectral sensing data being less than the threshold confidence level, adaptively controlling display color of the display based at least on the light sensing data and color calibration values of a spectral light source profile selected based at least on historical spectral sensing data having a confidence level greater than the threshold confidence level and received prior to determining that the confidence level of the spectral sensing data is less than the threshold confidence level. In this example and/or other examples, adaptively controlling display color of the display may include adjusting at least one of color values and brightness values of pixels of the display based at least on the color calibration values of the selected spectral light source profile.

In another example a computing device comprises a spectrometer positioned on a first side, a display positioned on a second side that opposes the first side, a light sensor positioned on the second side, a controller configured to receive spectral sensing data via the spectrometer, receive light sensing data via the light sensor, select a spectral light source profile from a plurality of different spectral light source profiles based at least on the spectral sensing data, each of the plurality of different spectral light source profiles having different color calibration values, and adaptively control display color of the display based at least on the light sensing data and the color calibration values of the selected spectral light source profile. In this example and/or other examples, the controller may be configured to determine a confidence level of the spectral sensing data, based at least on the confidence level of the spectral sensing data being greater than a threshold confidence level, select the spectral light source profile from the plurality of different spectral light source profiles based at least on the spectral sensing data, based at least on the confidence level of the spectral sensing data being less than the threshold confidence level, select a default profile having default color calibration values that differ from the color calibration values of any other of the plurality of different spectral light source profiles, and adaptively control display color of the display based at least on the light sensing data and the default color calibration values of the selected default profile. In this example and/or other examples, the controller may be configured to determine a first color temperature parameter value based at least on the spectral sensing data, determine a second color temperature parameter value based at least on the light sensing data, and the confidence level of the spectral sensing data may be determined based at least on a correlation between the first color temperature parameter value and the second color temperature value. In this example and/or other examples, the computing device may be a mobile computing device, further comprising a hinge, a hinge angle sensor configured to determine a rotation angle of the hinge, and the mobile computing device may be configured to fold about the hinge between an unfolded posture and a folded posture, the spectrometer may be at least partially covered by a folded portion of the mobile computing device when the mobile computing device assumes the folded posture, and the confidence level of the spectral sensing data may be determined based at least on the rotation angle of the hinge. In this example and/or other examples, the controller may be configured to subsequent to adaptively controlling display color of the display based at least on the light sensing data and the color calibration values of the selected spectral light source profile, determine that the confidence level is less than the threshold confidence level based at least on a change in the spectral sensing data and/or the light sensing data, select the default profile based at least on the confidence level being less than the threshold confidence level, and adaptively control display color of the display based at least on the light sensing data and the default color calibration values of the selected default profile. In this example and/or other examples, adaptively controlling may include transitioning from the color calibration values of the selected spectral light source profile to the default color calibration values of the selected default profile via a ramp function. In this example and/or other examples, adaptively controlling may include transitioning from the color calibration values of the selected spectral light source profile to the default color calibration values of the selected default profile via an intermediate multi-step function. In this example and/or other examples, the controller may be configured to based at least on the confidence level of the spectral sensing data being less than the threshold confidence level, adaptively control display color of the display based at least on the light sensing data and color calibration values of a spectral light source profile selected based at least on historical spectral sensing data having a confidence level greater than the threshold confidence level and received prior to determining that the confidence level of the spectral sensing data is less than the threshold confidence level. In this example and/or other examples, adaptively controlling display color of the display may include adjusting at least one of color values and brightness values of pixels of the display based at least on the color calibration values of the selected spectral light source profile.

In yet another example, a mobile computing device comprises a spectrometer positioned on a first side, a display positioned on a second side that opposes the first side, a light sensor positioned on the second side, a hinge, wherein the mobile computing device is configured to fold about the hinge between an unfolded posture and a folded posture, wherein the spectrometer is at least partially covered by a folded portion of the mobile computing device when the mobile computing device assumes the folded posture, and a controller configured to receive spectral sensing data via the spectrometer, receive light sensing data via the light sensor, select a spectral light source profile from a plurality of different spectral light source profiles based at least on the spectral sensing data, each of the plurality of different spectral light source profiles having different color calibration values, and adaptively control the display based at least on the light sensing data and the color calibration values of the selected spectral light source profile. In this example and/or other examples, the controller may be configured to determine a confidence level of the spectral sensing data, based at least on the confidence level of the spectral sensing data being greater than a threshold confidence level, select the spectral light source profile from the plurality of different spectral light source profiles based at least on the spectral sensing data, and based at least on the confidence level of the spectral sensing data being less than the threshold confidence level, select a default profile having default color calibration values that differ from the color calibration values of any other of the plurality of different spectral light source profiles, and adaptively control display color of the display based at least on the light sensing data and the default color calibration values of the selected default profile.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of adaptively controlling display color of a display of a computing device, the method comprising:

receiving spectral sensing data via a spectrometer positioned on a first side of the computing device;

receiving light sensing data via a light sensor on a second side of the computing device that opposes the first side, the spectral sensing data having a higher spectral resolution than the light sensing data;

selecting a spectral light source profile from a plurality of different spectral light source profiles characterizing different types of ambient lighting conditions produced by different spectral light sources based at least on the spectral sensing data from the spectrometer for characterizing ambient lighting conditions, each spectral light source profile of the plurality of different spectral light source profiles having different color calibration values that are tuned to adjust the display color of the display to compensate for the ambient lighting condition produced by the spectral light source associated with the spectral light source profile; and adaptively controlling the display color of the display based at least on the light sensing data and the color calibration values of the selected spectral light source profile to calibrate the display color of the display to compensate for the ambient lighting condition produced by the spectral light source associated with the selected spectral light source profile.

2. The method of claim 1, further comprising:

determining a confidence level of the spectral sensing data;

based at least on the confidence level of the spectral sensing data being greater than a threshold confidence level, selecting the spectral light source profile from the plurality of different spectral light source profiles based at least on the spectral sensing data;

based at least on the confidence level of the spectral sensing data being less than the threshold confidence level, selecting a default profile having default color calibration values that differ from the color calibration values of any other of the plurality of different spectral light source profiles, and adaptively controlling display color of the display based at least on the light sensing data and the default color calibration values of the selected default profile.

3. The method of claim 2, further comprising:

determining a first color temperature parameter value based at least on the spectral sensing data;

determining a second color temperature parameter value based at least on the light sensing data; and wherein the confidence level of the spectral sensing data is determined based at least on a correlation between the first color temperature parameter value and the second color temperature value.

4. The method of claim 2, wherein the computing device is a mobile computing device that includes a hinge and a hinge angle sensor configured to determine a rotation angle of the hinge, wherein the mobile computing device is configured to fold about the hinge between an unfolded posture and a folded posture, wherein the spectrometer is at least partially covered by a folded portion of the mobile computing device when the mobile computing device assumes the folded posture, and wherein the confidence level of the spectral sensing data is determined based at least on the rotation angle of the hinge.

5. The method of claim 2, further comprising:

subsequent to adaptively controlling display color of the display based at least on the light sensing data and the color calibration values of the selected spectral light source profile, determining that the confidence level is less than the threshold confidence level based at least on a change in the spectral sensing data and/or the light sensing data;

selecting the default profile based at least on the confidence level being less than the threshold confidence level; and adaptively controlling display color of the display based at least on the light sensing data and the default color calibration values of the selected default profile.

6. The method of claim 5, wherein adaptively controlling includes transitioning from the color calibration values of the selected spectral light source profile to the default color calibration values of the selected default profile via either of a ramp function or an intermediate multi-step function.

7. The method of claim 2, further comprising:

based at least on the confidence level of the spectral sensing data being less than the threshold confidence level, adaptively controlling display color of the display based at least on the light sensing data and color calibration values of a spectral light source profile selected based at least on historical spectral sensing data having a confidence level greater than the threshold confidence level and received prior to determining that the confidence level of the spectral sensing data is less than the threshold confidence level.

8. The method of claim 1, wherein adaptively controlling display color of the display includes adjusting at least one of color values and brightness values of pixels of the display based at least on the color calibration values of the selected spectral light source profile.

9. The method of claim 1, wherein the spectral sensing data is ambient spectral sensing data absent of contributions of active illumination from the computing device, and wherein the light sensing data is ambient light sensing data absent of contributions of active illumination from the computing device.

10. A computing device comprising:

a spectrometer positioned on a first side;

a display positioned on a second side that opposes the first side;

a light sensor positioned on the second side;

a controller configured to:

receive spectral sensing data via the spectrometer;

receive light sensing data via the light sensor, the spectral sensing data having a higher spectral resolution than the light sensing data;

select a spectral light source profile from a plurality of different spectral light source profiles characterizing different types of ambient lighting conditions produced by different spectral light sources based at least on the spectral sensing data from the spectrometer for characterizing ambient lighting conditions, each spectral light source profile of the plurality of different spectral light source profiles having different color calibration values that are tuned to adjust display color of the display to compensate for the ambient lighting condition produced by the spectral light source associated with the spectral light source profile; and adaptively control the display color of the display based at least on the light sensing data and the color calibration values of the selected spectral light source profile to calibrate the display color of the display to compensate for the ambient lighting condition produced by the spectral light source associated with the selected spectral light source profile.

11. The computing device of claim 10, wherein the controller is configured to:

determine a confidence level of the spectral sensing data;

based at least on the confidence level of the spectral sensing data being greater than a threshold confidence level, select the spectral light source profile from the plurality of different spectral light source profiles based at least on the spectral sensing data;

based at least on the confidence level of the spectral sensing data being less than the threshold confidence level, select a default profile having default color calibration values that differ from the color calibration values of any other of the plurality of different spectral light source profiles, and adaptively control display color of the display based at least on the light sensing data and the default color calibration values of the selected default profile.

12. The computing device of claim 11, wherein the controller is configured to:

determine a first color temperature parameter value based at least on the spectral sensing data;

determine a second color temperature parameter value based at least on the light sensing data; and wherein the confidence level of the spectral sensing data is determined based at least on a correlation between the first color temperature parameter value and the second color temperature value.

13. The computing device of claim 11, wherein the computing device is a mobile computing device, further comprising:

a hinge;

a hinge angle sensor configured to determine a rotation angle of the hinge; and wherein the mobile computing device is configured to fold about the hinge between an unfolded posture and a folded posture, wherein the spectrometer is at least partially covered by a folded portion of the mobile computing device when the mobile computing device assumes the folded posture, and wherein the confidence level of the spectral sensing data is determined based at least on the rotation angle of the hinge.

14. The computing device of claim 11, wherein the controller is configured to:

subsequent to adaptively controlling display color of the display based at least on the light sensing data and the color calibration values of the selected spectral light source profile, determine that the confidence level is less than the threshold confidence level based at least on a change in the spectral sensing data and/or the light sensing data;

select the default profile based at least on the confidence level being less than the threshold confidence level; and adaptively control display color of the display based at least on the light sensing data and the default color calibration values of the selected default profile.

15. The computing device of claim 14, wherein adaptively controlling includes transitioning from the color calibration values of the selected spectral light source profile to the default color calibration values of the selected default profile via a ramp function.

16. The computing device of claim 14, wherein adaptively controlling includes transitioning from the color calibration values of the selected spectral light source profile to the default color calibration values of the selected default profile via an intermediate multi-step function.

17. The computing device of claim 11, wherein the controller is configured to:

based at least on the confidence level of the spectral sensing data being less than the threshold confidence level, adaptively control display color of the display based at least on the light sensing data and color calibration values of a spectral light source profile selected based at least on historical spectral sensing data having a confidence level greater than the threshold confidence level and received prior to determining that the confidence level of the spectral sensing data is less than the threshold confidence level.

18. The computing device of claim 10, wherein adaptively controlling display color of the display includes adjusting at least one of color values and brightness values of pixels of the display based at least on the color calibration values of the selected spectral light source profile.

19. A mobile computing device comprising:

a spectrometer positioned on a first side;

a display positioned on a second side that opposes the first side;

a light sensor positioned on the second side;

a hinge, wherein the mobile computing device is configured to fold about the hinge between an unfolded posture and a folded posture, wherein the spectrometer is at least partially covered by a folded portion of the mobile computing device when the mobile computing device assumes the folded posture; and a controller configured to:

receive spectral sensing data via the spectrometer;

receive light sensing data via the light sensor, the spectral sensing data having a higher spectral resolution than the light sensing data;

select a spectral light source profile from a plurality of different spectral light source profiles characterizing different types of ambient lighting conditions produced by different spectral light sources based at least on the spectral sensing data from the spectrometer for characterizing ambient lighting conditions, each spectral light source profile of the plurality of different spectral light source profiles having different color calibration values that are tuned to adjust display color of the display to compensate for the ambient lighting condition produced by the spectral light source associated with the spectral light source profile; and adaptively control the display based at least on the light sensing data and the color calibration values of the selected spectral light source profile to calibrate the display color of the display to compensate for the ambient lighting condition produced by the spectral light source associated with the selected spectral light source profile.

20. The mobile computing device of claim 19, wherein the controller is configured to:

determine a confidence level of the spectral sensing data;

based at least on the confidence level of the spectral sensing data being greater than a threshold confidence level, select the spectral light source profile from the plurality of different spectral light source profiles based at least on the spectral sensing data; and based at least on the confidence level of the spectral sensing data being less than the threshold confidence level, select a default profile having default color calibration values that differ from the color calibration values of any other of the plurality of different spectral light source profiles, and adaptively control display color of the display based at least on the light sensing data and the default color calibration values of the selected default profile.

* * * * *